INVENTORS
RAYMOND A. REZNICEK
JULIAN L. CHALK
BY
*Richard G. Geib*
ATTORNEY

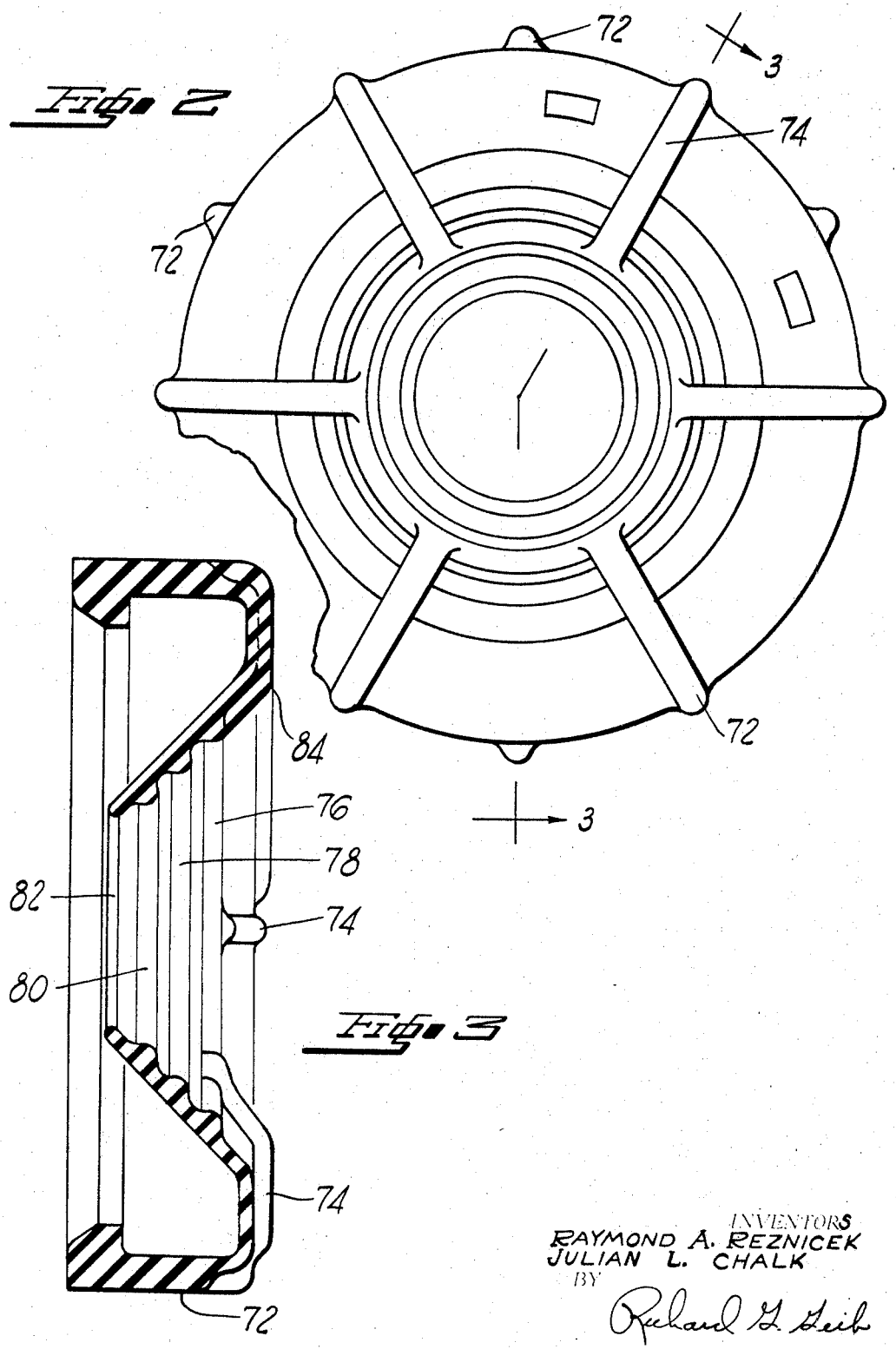

United States Patent Office 3,426,531
Patented Feb. 11, 1969

3,426,531
MASTER CYLINDER BOOT
Raymond A. Reznicek and Julian L. Chalk, St. Joseph, Mich., assignors to The Bendix Corporation, a corporation of Delaware
Filed Sept. 11, 1967, Ser. No. 666,765
U.S. Cl. 60—54.6
Int. Cl. F15b 7/08; F16j 15/52
10 Claims

ABSTRACT OF THE DISCLOSURE

A boot for closing the end of a bore of a master cylinder which will maintain sealing contact with the piston of the master cylinder regardless of the pressure differential across the boot.

Summary

Recently, vehicle manufacturers have desired to vacuum bleed a master cylinder and the vehicle braking system at its installation on the vehicle. More particularly, it has been desired by certain of the vehicle manufacturers to install the elements of a braking system and apply thereto a device for drawing the vacuum within the system. After the vacuum has been drawn, a valve is turned to pull hydraulic fluid into the system.

In that the master cylinder constructions of the present state of the art all provide for sealing the rearward faces of the pistons therein so that fluid may not flow from within the bore to the exterior of the master cylinder, this vacuum bleeding of a brake system would require the addition of another seal facing the open end of the bore of the master cylinder to prevent the introduction of air by the aforementioned or secondary seal, as they may be termed, during the vacuum bleeding.

This invention has for a primary purpose the teaching of the use of a boot of novel design fitting over the end of the master cylinder adjacent the bore for the pistons thereof and abutting the rear face of the piston means in its released attitude to permit a pressure differential to be drawn across the boot during the vacuum bleeding.

Drawing description

FIGURE 2 is an end view of the boot in accordance with the principles of this invention in enlarged form; and FIGURE 3 is a cross sectioned view along lines 3—3 of FIGURE 2 of the enlarged detail of the boot in accordance with the principles of this invention.

Detailed description

Figure 1:
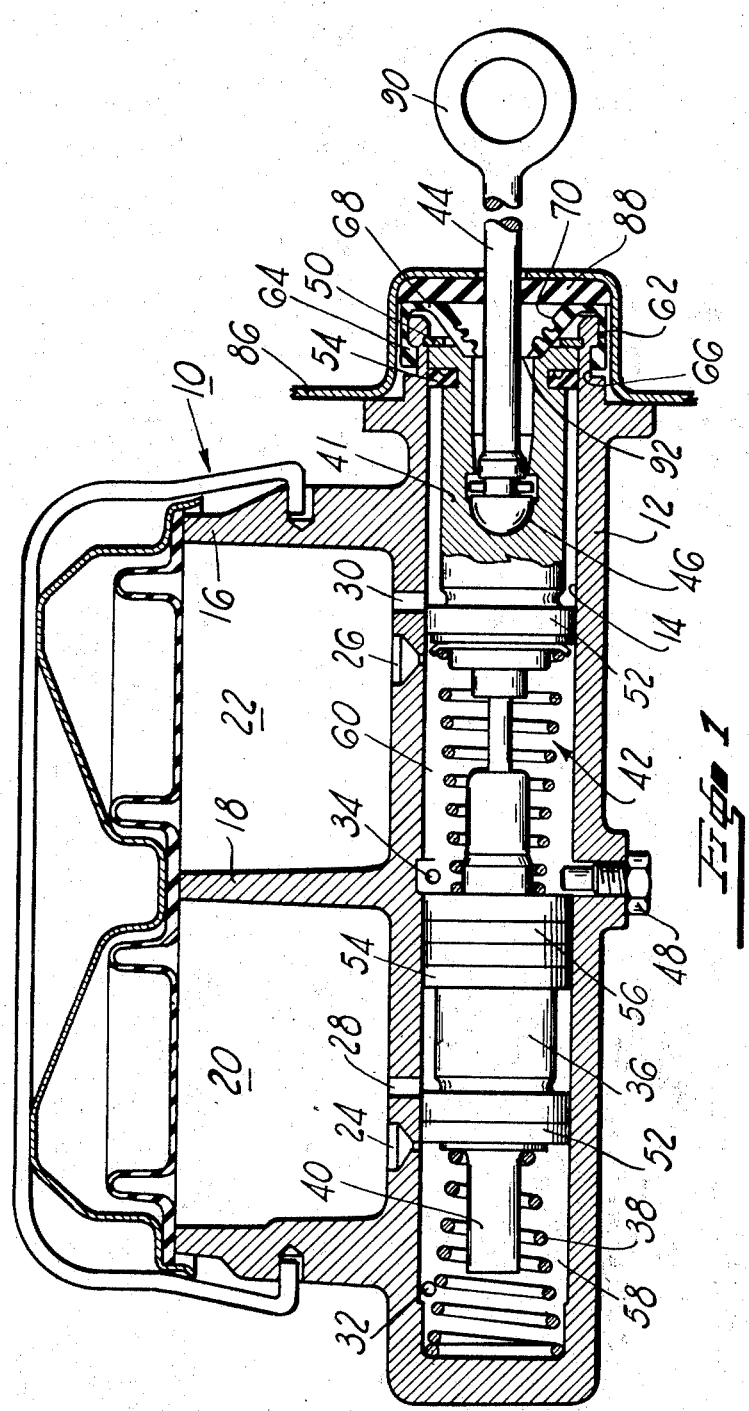
FIGURE 1 shows a master cylinder of a type well known in the prior art in cross section with a boot of novel design in accordance with the principles of this invention assembled thereto with the master cylinder in turn being assembled to surrounding structure.

With particular regard now to FIGURE 1 there is shown a master cylinder 10 of the split-system type, as will be readily familiar to those skilled in the art embodying a housing 12 having an axial bore 14, which housing is also provided with a reservoir wall 16 having an internal partition 18 dividing the reservoir cavity into separate reservoir chambers 20 and 22. After the necessary operations providing the compensating ports 24, 26, the filler ports 28, 30, the discharge ports 32, 34 and the desired finish for the bore 14, secondary piston 36 is inserted into the bore with a return spring 38 over a forwardly projecting stop portion 40 thereof until the return spring rests on the bottom of the bore 14. Next a primary piston 41 having a caged spring assembly 42, as will be familiar to those skilled in the art, is inserted into the bore 14 until the spring retainer of the cage spring assembly 42 abuts onto the rear face of the secondary piston 36. The primary piston has a push rod 44 attached thereto in a spherical socket 46 and the secondary piston 36 and primary piston 41 are forced into the bore until a stop bolt 48 may be inserted through the housing 12 to limit the rearward travel of the secondary piston 36; and a snap ring 50 can be inserted into a groove within the bore 14 to limit the rearward travel of the primary piston 41.

As may be realized by those skilled in the art the secondary piston 36 and the primary piston 41 are provided with primary and secondary seals 52 and 54 and the secondary piston is provided with a rearwardly facing seal 56. Thus, the master cylinder of the type shown by FIGURE 1 is provided with separate pressure developing chambers 58 and 60.

The master cylinder construction is then completed by assembling a boot 62 to the end of the master cylinder housing 12 adjacent the opening of the bore 14 therefrom. This assembly is by means of placing a beaded portion 64 within a recess 66 of the housing, which beaded portion is undersized with respect to the depth of the housing so as to provide a snap fit of the beaded portion therewith. The beaded portion has a trailing skirt 68 projecting therefrom about the end of the housing 12 to terminate in a conical portion 70. Further details of this boot construction may be had with reference to FIGURES 2 and 3 that show the boot to have a plurality of axially extending ribs 72 some of which, as at 74 project from the beaded portion over the trailing skirt and around into the conically shaped portion 70. Furthermore, with reference now to FIGURE 3, there is shown a plurality of concentric or annular reinforcing ribs 76, 78 and 80 between the opening 82 of the boot and the end of the trailing skirt, as at 84 adjacent the end of the housing 12. The master cylinder 10 is now ready for assembly to surrounding structure such as a firewall 86 (see FIGURE 1) having a rubber seal 88, if desired, between the firewall 86 and the boot 62 to prevent open communication of the engine side of the firewall to the passenger side of the firewall about the juncture of the master cylinder thereto. As will be understood by those skilled in the art to which the invention relates, the push rod 44 is then connected as by an eyelet 90 to a brake pedal within the vehicle. If desired, the master cylinder 10 may be assembled similarly to the forward shell of a power booster such as is shown by U.S. Patent No. 3,106,873 and others.

As the operation of the master cylinder is, as has been stated repeatedly above, readily apparent to those skilled in the art to which this invention relates, it would appear redundant to go through the operation at this time in the state of the art. However, it is deemed necessary to dwell on the advantages of the boot 62 with regard to the bleeding operation of the master cylinder after its assembly to a firewall 86 or a power booster shell. In this regard, it should be noted that a vacuum apparatus is attached to the outlet lines leading from the discharge ports 32 and 34 to draw a vacuum in the vehicle braking system. This attachment is preferably by a valving device (not shown) which has provision for the attachment thereto of a hydraulic fluid supply. After a sufficient vacuum has been drawn in the braking system the valve is operated to terminate the communication with the vacuum drawing apparatus and open communication thereafter with the hydraulic fluid supply so that the hydraulic fluid may be drawn into the braking system.

During the drawing of a vacuum in the braking system a pressure differential will be created across the boot 62. This will have a tendency to draw the boot 62 in further within the bore 14 increasing the contact force of the boot about the edges of the opening 82 thereof with the rear face 92 of the primary piston 41, which rear face may have tapered provisions shown to insure a greater sealing contact of the edges of the boot about the opening 82 therewith. Without the reinforcing ribs 76, 78 and 80 the conically shaped portion of the boot 62 would draw upwardly in various areas to abut the retaining ring 50 and cause puckering of the lip about the opening 82 destroying the sealing engagement of the boot with the rear face 92 of the piston. However the concentric rings or reinforcing ribs 76, 78 and 80 prevent this distortion of the conically shaped portion of the boot 62. Finally, the axially extending ribs 72 prevent interference of the boot with the surrounding structure 86 and permit introduction of air when piston 41 is moved into the bore 14 to prevent a vacuum from developing behind the boot and the master cylinder housing 12. Also these axially extending ribs 72 stiffen the trailing skirt section of the boot 62 and insure the snap attachment of the beaded portion 64 of the boot within the recess 66 of the housing 12. Lastly, the extension of a few of the ribs about the trailing skirt into the conically shaped portion, as shown by the ribs 74 of FIGURE 2, preclude the forming of an interference seal with the rubber seal 88 that may prevent the fluid passage aforementioned.

Having described an operative construction of the invention, it is now desired to set forth the intended protection sought by these Letters Patent in the appended claims.

We claim:

1. A master cylinder comprising:
   a housing having an open ended bore therein with an inlet port from a reservoir cavity to the bore and an outlet port therefrom;
   piston means operatively arranged to be actuatable to close said inlet port and thereafter pressurize fluid for delivery through said outlet port; and
   a sealing boot affixed to said housing adjacent said open end, said boot having an inwardly projecting portion extending around the end of said housing into said bore area and abutting a rear face of said piston means in its rearward, rest position in said bore.

2. The structure of claim 1 wherein said sealing boot has radial ribs at spaced intervals to reinforce said boot in the radial plane and provide a space about said boot and the structure to which the master cylinder is attached.

3. The structure of claim 1 wherein said inwardly projecting portion extends into said bore at an angle to the bore and terminates as an annular body within the bore.

4. The structure of claim 3 wherein said annular body has a plurality of annular ribs spaced to reinforce said body so that it may not pivot away from the abutment with the piston means under the influence of a pressure differential across said boot.

5. The structure of claim 4 wherein said boot further has a beaded portion snap fitted to a recess in the exterior of said housing.

6. The structure of claim 4 wherein said sealing boot has radial ribs to permit spaces about said boot and the structure to which it is attached.

7. The structure of claim 5 wherein said sealing boot has radial ribs to permit spaces about said boot and the structure to which it is attached.

8. A boot for sealing the open end of a master cylinder bore within which a master cylinder piston is operatively arranged, said boot comprising:
   a beaded portion affixed to a recess within the master cylinder housing adjacent the open end of said bore, said beaded portion having a trailing skirt parallel to said housing and passing around the end of same;
   an annular conical shaped portion extending from the trailing skirt adjacent the end of said bore into said bore to terminate at an opening in said boot whose adjacent edges abut said piston on its rearward face; and
   concentric ribs on said conically shaped portion spaced between the boot opening and the trailing skirt of the beaded portion to prevent puckering of said conically shaped portion whenever a pressure differential is created across said boot.

9. The boot of claim 8 and further comprising axial ribs on said trailing skirt towards the end of said housing to stiffen said boot laterally.

10. The boot of claim 9 wherein at least some of the axial ribs extend on the trailing skirt over the end of said housing onto the conically shaped portion to prevent interference of the boot and surrounding structure to which the master cylinder is to be united.

References Cited

UNITED STATES PATENTS

| | | | |
|---|---|---|---|
| 1,712,882 | 5/1929 | Gleason et al. | 60—54.6 XR |
| 2,202,351 | 5/1940 | Loweke | 60—54.6 |
| 2,608,062 | 8/1952 | White | 60—54.6 |

MARTIN P. SCHWADRON, *Primary Examiner.*

ROBERT R. BUNEVICH, *Assistant Examiner.*

U.S. Cl. X.R.

277—178, 212